March 17, 1970   D. E. DREIER ET AL   3,501,133
SPARGERS WITH AUXILIARY TUBES FOR DEPENDABLE DRAIN AND
WIDE RANGE AIR FLOW
Filed April 23, 1969
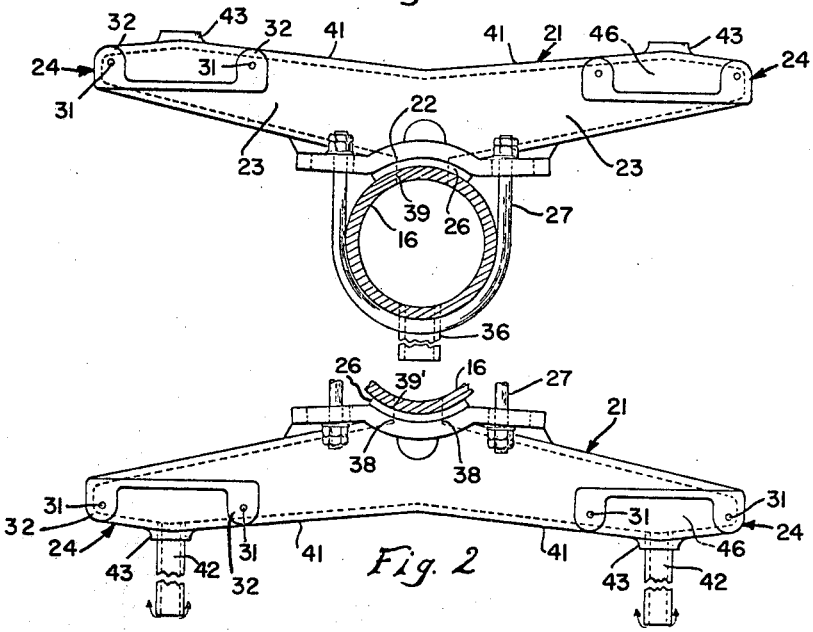
Fig. 1
Fig. 2
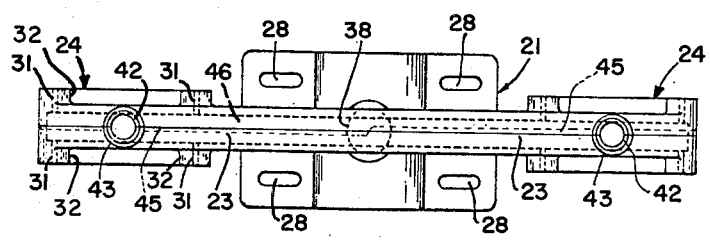
Fig. 3
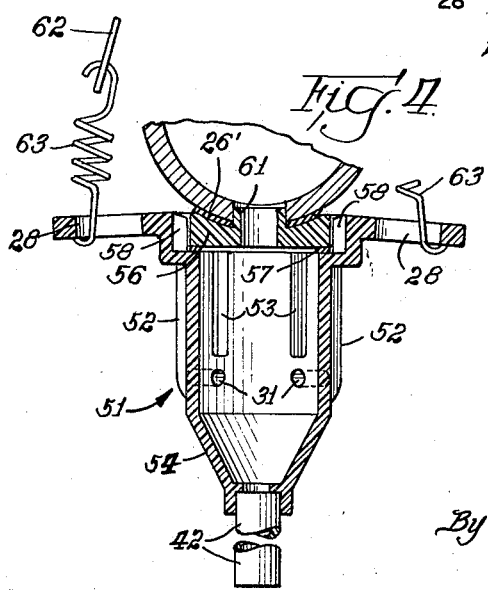
Fig. 4
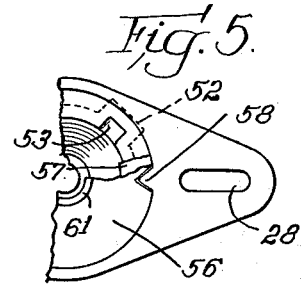
Fig. 5
Inventors
Douglas E. Dreier and
James Donald Walker
By Darbo, Robertson and Vandenburgh
Att'ys

United States Patent Office 3,501,133
Patented Mar. 17, 1970

3,501,133
SPARGERS WITH AUXILIARY TUBES FOR DEPENDABLE DRAIN AND WIDE RANGE AIR FLOW
Douglas E. Dreier, North Aurora, and James Donald Walker, Aurora, Ill., assignors to Chicago Bridge & Iron Company, a corporation of Illinois
Continuation-in-part of applications Ser. No. 581,632, Sept. 23, 1966, and Ser. No. 699,524, Jan. 22, 1968. This application Apr. 23, 1969, Ser. No. 818,616
Int. Cl. B01d 47/02
U.S. Cl. 261—124
17 Claims

ABSTRACT OF THE DISCLOSURE

Efficient aeration and stirring are achieved by concentrated air-lift columns each developed by discharging air through a cluster of orifices deep in a body of liquid. In each cluster, four orifices are arranged to form an effective air-lift pattern. Great variation of air volume is made possible by a downwardly extending secondary orifice-and-drain tube. At minimum volumes of air the tube is almost water-sealed so that nearly all air is discharged through the pattern-forming orifices. With greater volumes of air most of the additional air discharges through this auxiliary tube, with relatively little increase in back pressure. All air from this tube rises into the pattern and supplements the air-lift force. Air supply passages leading to the pattern orifices are reliably drained even at low pressure because when both pattern orifices and secondary tubes are below the air supply passages, there is no water to settle. In double spargers, adjacent supply passages slope downwardly toward the drain tubes. After shutdowns in which liquid fills the air supply pipes, it is discharged almost entirely through drain tubes, including a larger and longer one provided for this purpose. Plastic members may provide single or double spargers.

INTRODUCTION

This application is in part a continuation of our applications, Ser. No. 581,632, filed Sept. 23, 1966, and 699,524, filed Jan. 22, 1968, both abandoned after the filing of the present application.

More specifically, it relates to nonclog sparger units for submerged liberation of air in the aeration of sewage.

By prior Patent No. 3,153,682, one of the present applicants taught a disbelieving sewage industry how to obtain aeration efficiency in sewage treatment even though air is liberated through gross orifices, orifices large enough to substantially eliminate clogging in the intended manner of operation. Prior to that time porous media (for fine-bubble diffusion) had been standard, even though its clogging propensity was a recognized and severe problem.

The preferred form of the present invention extends the clog-free characteristics to a wider range of operation, provides both air flow and absorption efficiency over a wide range of air flow rates, and provides (when double spargers are the chosen form) a double row of clusters of orifices with only one header.

At the time of that patent, it was thought best that the spargers disclosed by it be arranged mostly in a single line. That may still give maximum efficiency. Recently, however, various versions of the activated sludge treatment of sewage have been subjected to such heavy loadings, in terms of biochemical oxygen demand (BOD), that more air is required than can be liberated through a single line of spargers operating at maximum efficiency. In short, there are more and more installations in which it is thought to be more efficient to have two lines of spargers than one. Of course, the two lines of spargers should be reasonably close together so as to contribute to the same over-all rolling movement of the contents of a tank as was previously produced by a single line of spargers. However, the spargers cannot be placed too closely together without danger of losing the characteristic of isolated air-lift columns, with loss of efficiency.

According to one aspect of the present invention, the two lines of spargers are economically provided by using one line of molded units, each of which provides two spargers. Furthermore, the sparger at each end of the unit releases air into essentially the same pattern of proved efficiency of the prior single spargers, although the physical structure is quite different. Having twice as many spargers increased a problem of accommodating great variations of air volume. When the sewage loading is light enough to require only a minimum of air, there was a further problem of allowing sludge-bearing liquor to dry inside the pipes.

Another problem which had to be solved was avoiding the sedimentation of sludge within the double units as a result of temporary discontinuance of air flow. Should such sludge be allowed to remain in place, it would be dried to a crust by the hot compressed air which passes over it. According to preferred forms of the present invention, both problems are solved by mounting the sparger on the bottoms of headers and providing each sparger with a downwardly extending short tube serving as a drain and as a secondary orifice. At the same time, the conduit arms of double spargers are so sloped that the sludge can be washed out after a shutdown has allowed the pipes to fill with liquid. The sludge is washed down through the unit and flushed out through this tube to avoid any risk of its being baked in place by the hot air.

Additional objects and advantages of the invention will be apparent from the following description and from the drawings.

DESIGNATION OF FIGURES

FIGURE 1 is a side view of the double sparger of the present invention shown applied to the top of a header which is shown in vertical cross section, a downwardly extending flushout tube being shown broken away;

FIGURE 2 is a view similar to FIGURE 1 except showing the double sparger mounted as preferred on the bottom of the header, and sparger secondary tubes, both of these tubes being shown broken away;

FIGURE 3 is a fragmentary plan view of the double sparger of FIGURE 1;

FIGURES 4 and 5 are views of a single sparger unit embodying this invention, some subsequent improvements also being shown. FIGURE 4 is in part a vertical section, and FIGURE 5 is a top view, broken away for clarity.

BACKGROUND DESCRIPTION

Part of the background of the invention is reasonably clear from Patent No. 3,153,682 from which is may be seen that the header 16, given the same number here, is located near the bottom of a tank and close to one side of an area which is to be aerated and put into rolling motion. A series of such headers may extend along one line for the full length of a tank, for example. With a series of adequately separated spargers mounted along the header 16, the total air supply required for treatment of the sewage in the tank was divided between the spargers. Each sparger divided its supply of air into four streams closely grouped together so that they cooperated to produce one concentrated air-lift column. With the help of interaction from adjacent water more or less surrounding the column, great turbulence was developed which caused a breakup of the air streams or large bubbles therein to produce a multitude of fine bubbles. This action, together with a superior rotation of the body of liquid resulted in a degree of efficiency of aeration which had previously been thought utterly impossible when air is liberated in large bubbles, i.e., through orifices large enough not to clog from air-borne particles.

In recent years, as cities have grown faster than sewage treatment plants, heavier and heavier loading has been imposed upon the various versions of activated sludge treatment plants. Engineers have found that at least one and one-half to two times the traditional thirty-five pounds of BOD/1000 cu. ft. can be successfully treated, at least where the air liberation facilities are adequate. There has been a tendency to require two lines of spargers, and this has required considerable expense in piping.

Providing two lines of spargers in new plants to take care of expected population growth tends to result in using relatively little air per sparger in early years while the plant loading is light, i.e., before the population growth occurs. This tends to increase the danger of causing a difficulty occasionally encountered with single spargers if they were used at inadequate air pressures. This was the flaking off of dried sludge within headers, and resultant clogging of some sparger orifices. The inadequate air pressure may fail to blow all sludge out of the headers, even when blow-off legs of Patent No. 3,242,072 are provided. The residual sludge may then be dried by the air passing through the headers, this air being heated by its compression. If the dried sludge flakes off the header, it may clog the orifices which are substantially clog-proof when properly used.

DESCRIPTION OF THE PRESENT DOUBLE SPARGER INVENTION

According to one preferred form of the present invenvention, the two lines of spargers are provided with no danger of residual sludge in the headers and with no additional piping, as compared to single lines of spargers, except the conduit portions of the double sparger units themselves. As seen in FIGURE 1, each sparger unit 21 may be mounted on top of header 16. Although this location was deemed desirable in case of a header from which single spargers heretofore installed have been removed, the FIGURE 2 arrangement is now greatly preferred. In either case, the double sparger 21 has a mounting base 22 and a pair of conduit arms 23 leading to spargers 24. As with single spargers, the mounting may be made by means of a gasket 26 and U bolts 27. As seen in FIGURE 3, the mounting base 22 for double spargers is provided with four slotted apertures 28, so that two U bolts are required. The elongation of the slots is helpful in permitting the use of U bolts with different spans for different header diameters. The gasket 26 may be an improved gasket according to the teachings of U.S. patent application S.N. 570,954, now abandonded, which makes the sealing quite dependable for a substantial variation in pipe diameters, even though a single form of double spargers is used and hence a single curvature of the saddle-type mounting base 22.

THE SPARGERS

As seen best in FIGURE 3, each of the spargers 24 has four tubular orifices 31 ("long tube" as compared to a thin wall) as in the preferred form of spargers in Patent No. 3,153,682. Here, however, practical considerations in production of double spargers indicate the desirability of having all of the orifices 31 parallel to one another instead of crossing another. Nevertheless, the orifices are so distributed that even with this parallel disposition, a satisfactory pattern of air distribution is provided, yielding substantially the rise-point pattern that has served to well heretofore. As before, four individual air streams are liberated with sufficient separation to produce separate streams safely, but close enough together to cooperate with one another in producing a concentrated air-lift column. At present the preferred spacing of the orifices is on three and one-quarter inch centers for the spacing seen in FIGURE 1 with a span in the transverse direction of approximately one and three-quarter inches. This much span can be provided economically by bosses 32 through each of which one of the four orifices is formed, preferably by molding, Except for another aspect of the invention, the diameter of the orifices would vary according to the amount of air which an engineer expects to be liberated. As with single spargers, they could readily be replaced if an engineer decides that a quantity of air should be liberated which is greatly different from that for which the orifice was designed. Theoretically, the orifices could be drilled larger, but the decision may be against doing so because of the desire for a very smooth inside surface of the long tube orifices to help substantially eliminate clogging.

FLUSHING OF SLUDGE FROM DOUBLE SPARGERS

When the supply of compressed air is shut off for any reason, the liquid being treated, including some sludge, will enter the spargers and the air supply pipes. If no other entry were provided, it would enter through orifices 31. When the air supply is resumed, it is highly desirable that all of the sludge be flushed out of the system. With respect to single spargers, this was adequately taught by U.S. Patent No. 3,242,072, issued to the present applicant Walker. With the old single sparger construction, if the shutdown was long enough to permit settling of sludge, it would tend to settle out of the sparger unit into the header. The sludge that settles on the bottom of header 16 can be flushed out upon resumption of air supply by virtue of provision of a down-flush tube 36 which communicates with the bottom of the header at the ends thereof remote from the air supply line and has heretofore extended down far enough so that air does not ordinarily escape through the down-flush tube 36. However, when the air has been shut off and the air pressure has dissipated so that the pipe system is full of water to the level of the water in the tank, the resumption of air causes a strong flow of water down through the flush-out tube 36 and this flow of water carries with it most of the sludge which had settled to the bottom of the header 16.

With the top mounting of a double sparger as in FIGURE 1, when air supply is resumed after a shutdown, the pressure of air in arms 23 will quickly approximately equal the pressure of air within header 16. This results from the fact that the connecting passage 38 is at least several times the area of the sum of the areas of the orifices 31. With such near equality of air pressure, air liquid in the double sparger unit 21 will all flow down the arms 23 and through communicating passage 38 into the header 16. The slope of the arms 23 should be such as to ensure that this flow of liquid carries the sludge with it. The illustrated slope is believed to be such as will safely accomplish this result. At present it is expected that for double spargers the communicating aperture 38 will have a diameter of about an inch and one-eighth the side walls of body 21 being bulged if necessary to provide this diameter.

Except when peculiar conditions justify replacing spargers mounted on top of headers without turning the headers, it is greatly preferred to mount the double sparger units on the undersides of the headers 16. Of course, in this event, apertures 39' will be provided in the bottoms of the headers instead of the apertures 39 in the tops of the headers. This bottom mounting at first presented a difficult problem of flushing out the sludge, because the sludge will not run down into the headers from the double spargers. According to the form of the double sparger invention at present greatly preferred, this problem is solved by two cooperating steps. The wall 41 of the sloping arms 23 which is now the bottom wall, is sloped somewhat correspondingly to the slope previously discussed. Thus, as seen in FIGURE 2, when liquid which has collected in arms 23 during a shutdown is blown out through spargers 24, the slope of surfaces 41 tends to ensure that the sludge will be swept with the water. However, it is preferred that this liquid be discharged other than through the orifices 31, for the most part. This is accomplished by providing down-flush tubes 42 extending from the low point of each sparger 24.

At the present time, it is intended to provide bosses or thickened sections 43 at the appropriate point of each sparger, to receive these tubes. If the sparger is mounted as in FIGURE 1, these bosses will have no passages through them. It is easy to modify the mold to provide the passages or not, depending on whether the bottom mounting or top mounting is planned. Down-flush tube 42 is easily cemented into a boss 43, which may be stepped to provide a seat for the tube 42.

With top mounted spargers, the usual down-flush tube 36 at each remote end of the header 16 is preferably provided. With bottom mounted spargers, each having its own tube 42, a single additional blow-off tube, directly below the riser pipe, is preferred for taking care of most of the water and sludge in the riser pipe headers. This single blow-off pipe should have the I.D. of the riser pipe and be long enough so that during aeration no air will escape.

It is preferred that the double sparger units be separated lengthwise of the headers far enough so that the concentrated air-lift columns will have a fair degree of individuality and hence a good chance for turbulence-producing interaction with surrounding water. At the present time, a longitudinal separation of the centers in a range of twelve inches is preferred. With present air requirements, this tends to mean that except when plant loading is low there will be enough air issuing through each sparger (i.e. each end cluster of orifices) to be within the range of eight to sixteen cubic feet per minute which has been considered optimum. As loadings continue to rise and hence air requirements rise also, closer spacings may be tried, and perhaps they will be found not to interfere with the efficiency, or not to interfere excessively.

BOTTOM MOUNTING ELIMINATES LOW-PRESSURE FLAKING

The preferred mounting of the spargers on the bottoms of the headers eliminates the danger discussed above of failing to drain the headers when the air-flow is so low that with top-mounting sludge would not be excluded from the headers and would be dried by the passing air. It is apparent from FIGURE 2 that enough air pressure to cause a mere trickle of air through the orifices 31 would drain all liquid from header 16, since it can flow downwardly from the bottom of the header. Although a mere trickle of air would be undesirable for other reasons, the freedom from danger permits new thinking as to what flows are desirable.

SHORT TUBES ENCOURAGE WIDE RANGE AIR FLOW AND STAY CLEAN

With the danger from low flow eliminated, and with blow-off legs 42 extending down from each sparger, a new type of operational planning becomes feasible, namely flexibility of use over a wide range of air flow rates. When a treatment plant is new and its loading light, the air flow can be quite low without danger of clogging. Even 4 cubic feet of air per minute through each cluster of orifice (meaning through each single sparger or each end of a double sparger) provides a good rise pattern for the air, and a good turbulent air-lift column. Even if oxygen absorption should be less efficient than at twice this volume, if smaller volume provides sufficient oxygen absorption, it saves power as compared to the larger volume.

However, if orifices 31 are small enough to avoid creeping-in of liquid at the low rate of air flow, forcing three or four times as much air through these small orifices 31, would cause high back pressure which might be excessive from the standpoint of cost of compression. It might even require more expensive compressors to pump the air at the higher back pressure. It has been found, however, that this can be avoided by shortening tubes 42 drastically as compared to practice long followed with differently located flush-out tubes, so that at higher air rates the added air escapes through these tubes without any excessive increase in back pressure.

Air flow through such an outlet as the large bottom opening of a tube 42 has been notably inefficient heretofore. It has now been found not to be inefficient, however, when located directly below an effective concentrated air-lift column established by air liberated in the pattern already indicated. The air from pipe 42 rises into that column, is immediately broken up by its turbulence, and then adds to the air-lift force and makes the column more turbulent.

The vertical spacing between orifices 31 and the outlet of tube 42 now planned is six inches. However, any spacing which at expected higher air volumes will let a substantial part of the air escape through the tube 42 is an improvement over prior practice and inconsistent with prior thinking. However, it is preferred to make tubes 42 so short that air will trickle from them even at the normal minimum air flow rates to make sure these tubes do not clog as a result of sludge standing in them for long periods. If high rates are not expected, four inches may be preferred, up to eight with a higher range.

At present, it is believed that with the short auxiliary outlet tubes 42, all or nearly all spargers can be made with the orifices 31 of a standard size. Three-sixteenths of an inch is the diameter now planned as standard. This is small enough to prevent the water from creeping in even if the air flow is only 4 cubic feet of air per cluster of orifices; and large enough to be quite free from clogging by screened air. It is also large enough to pass at low back pressure enough air to set the character of the concentrated air-lift column even if at least an equal quantity of supplemental air joins that column by passing through tube 42. The top limit of supplemental air, if there is a top limit, has not yet been determined.

The design of sparger indicated has unusually low frictional head loss as the air approaches the orifices 31. This contributes to the lowness of maximum back pressure and total head loss to achieve substantial economy of both power and pressure-availability in pumping. This invention has already been used to help "save" one plant in which loading and consequent higher air requirements were on the verge of passing the pumping ability because of the limited pressure available. The substitution of the new spargers helped to enable the old pumps to liberate the greater volume of air required.

SINGLE SPARGERS USING SAME IMPROVEMENTS

This short tube at the bottom of a sparger cluster has been found so beneficial in double spargers that it is also being used in single spargers. These new single spargers with short supplemental tubes are therefore now being mounted on the bottoms of headers. Present tests indicate that aeration efficiency and power efficiency are both higher with such single spargers than with former spargers, as is true with double spargers. Single spargers are provided with a clamping saddle such as 22 (but with a single set of U bolt holes 28). Preferably the saddle and the orifices 31 of a single sparger are respectively at the top and bottom of a cup-shaped body so that the spacing of orifices 31 below the header can be made the same in single and double spargers. This permits them to be used in the same plant (or even on the same header). They may be interchanged without the difficulties that would arise from differing submergence depths of the orifices.

MOLDING OF SPARGERS

The sparger bodies are preferably molded with sockets into which tubes 42 are cemented. The bowl-shaped body of single spargers can be molded in one piece, the double sparger body in two identical halves, each having a saddle-shaped half of saddle. The saddle of the single spargers may be cemented into the bowls. It is preferred that one of the slick-surface impact-resistant plastics be used. The plastic at present preferred in acrylonitrile-butadiene-styrene polymer, sold commercially as "Cycolac," grade E being a suitable quality.

The two identical halves for double spargers mate along the central vertical longitudinal plane. A tongue and groove joint is easily provided in such identical halves by having a tongue 45 extending along the joining edges on one side from the center of the length, and grooves on the other side to receive the tongue of the identical mating piece. Although a dependably permanent glue is used, it is at present preferred to provide rivets, also, thus removing any possible fear of separation even in many years of service. The rivets are distributed along the full periphery of the joint, matching lugs being provided to receive the rivets.

MODIFICATIONS

Although endless modifications are possible mentioning a few of the more likely may be helpful.

The saddle mount may be replaced by a threaded fitting, especially if replacing screw-on spargers should be desired.

The hole spacing can be varied widely but should not be varied substantially without compensating changes or testing for relative efficiency. Outlets spaced one and three-quarters inches along their common axes, with the axes spaced three and one-quarter inches apart are believed to give the same high efficiency as the widely used three-inch spargers, when used alike.

Spargers with the conventional orifice-arrangement on crossing axes could be used but such a double sparger molded as one piece or as described would present molding problems. The safe dimensions would be with the orifice outlets on a three-inch circle, or the equivalent (such as guiding the air streams out from outlets on a smaller circle).

The width of arms 23 is largely a matter of choice so long as the sludge flushes out adequately after shutdowns. At present an internal width of three-quarters inch (wider than scaling the drawings would indicate) is being provided, and it has proved sufficient. This somewhat shortens the molded orifice "bores" or tubes, but they are still "long tube" or tubular as compared to the very short tube effect of a mere aperture in a wall of, for example, one-eighth inch thickness. The opening of the orifices of uniform transverse dimensions directly into the large passage 46 of the arm 23 is ideal from the standpoint of minimizing clogging.

Orifice diameters less than one-eighth inch are unwise because of increased danger of clogging. The larger they are, the more air pressure and air speed they require to prevent water from creeping in, with danger of accretion-clogging. One-eighth to five-sixteenths have been used, but both air requirements and the above considerations are better met by five-thirty seconds to three-sixteenths to one-quarter inch. With the preferred form of the present invention, standardization on three-sixteenths inch was previously planned, but five-thirty seconds seems more the standard now. Both are small enough to avoid creeping-in of water with as little air as four cubic foot per minute per cluster.

ACHIEVEMENT

From the foregoing, it is seen that double sparger units have been provided which make it easy for engineers to provide two lines of independently acting spargers utilizing the teachings of Walker Patent No. 3,153,682, without any additional piping. In fact, the double sparger units could be mounted on the same headers from which single spargers have been removed, without the slightest change in the headers. Turning the headers over for bottom mounting yields better use of the invention.

A highly reliable degree of freedom from clogging is provided by following the principles set forth in said patent, with the further features here taught.

By mounting the spargers, whether double or single, on the bottoms of the headers and providing a blow-off tube directly below each cluster of orifices, low air flows can be tolerated without danger of drying sludge in headers. By making the blow-off tubes short enough to serve as auxiliary orifices the air flow can be increased several-fold without developing excessive back pressure, even though the orifices are small enough to avoid creeping-in of water at the lower rates of air flow. Great flexibility of use, with economy, is thereby made available. This permits standardizing on one orifice size, or two at the most. Of course, other sizes can be provided easily for exceptional uses. By making pipes 42 so short (4 to 8 inches is suitable) that water is not allowed to stand in them during aeration, their clogging is avoided. Even with normal air flows lower than normal mnimums, clogging of the tubes 42 can be avoided by blowing through tubes 42 every day. This is done either by briefly raising the air flow or by briefly shutting it off. In the latter event, water fills the pipes and upon resumption of air supply the initial surge of outflowing water clears the tubes and a burst of air follows.

Some of the advantages of the invention can also be obtained in liberation of gas or air in a gas-lift tube. Where there has previously been a long, normally liquid sealed blow-off tube extending down from a sparger it can be made more free of clogging by shortening it so that gas always blows from it or trickles from it. Such a device will also be superior for varying rates of gas discharge, if such varying rates should be desired.

SUPPLEMENTAL DISCLOSURE

In view of the "best mode" requirement of 35 U.S.C. 112, the following details are given, even though some may not be available for claiming as novel here, and some may be the planned subject matter of a later patent application.

As disclosed in Walker Process Equipment Bulletin No. 22D-S-106, distributed more than a year before the present application, the flush-out tube 36 is located directly below the riser pipe by which air is supplied to a header and is of a much larger diameter than are the supplementary discharge pipes 42. Because the flush-out tube 36 extends considerably deeper than the pipes 42, no air will be discharged from the tube 36, except possibly a surge, by momentum, each time operation is resumed. The tube 36 preferably has an internal diameter at least equal to that of the riser pipe and is aligned with it. During a long interruption of operation sludge from the riser pipe may settle out through the tube 36. If not, the settling may form a relatively dense slug, but this will be blown out easily when operation is resumed.

The preferred internal diameter of the auxiliary orifice tubes 42 is about 5/8 inch. This approximate dimension is discernible from the drawings of the parent application, other dimensions having been given. Experience with this diameter has shown a distribution of air among the numerous auxiliary orifices 42 to be satisfactorily uniform, even when a very substantial quantity of air is being blown out through them. Although diameters substantially larger might prove satisfactory, experimentation would be necessary for certainty. For example, with the present tubes there is a gradual increase in the flow of air through the primary orifices as the flow through the auxiliary pipes 42 is increased. This could be important for maintaining efficiency. Furthermore, without some minor back pressure developed by the auxiliary orifices, greater accuracy in placing all of the auxiliary orifices at the same level might be necessary. This would be especially true if there were no significant flow resistances in the separate paths to the various spargers.

The preferred form of the single spargers is shown in FIGURES 4 and 5. The dimensions are such as to locate the orifices 31 the same distance below the header as in the double spargers. Likewise the tubes 42 have their open bottoms the same distances below the headers and below orifices 31 as with the double spargers. Occasionally it is desirable to use both in the same tank, and this subjects all to the same pressures.

With the single spargers a single pair of securing holes 28 is enough.

The main body 51 of the single sparger may be easily made as a one piece molding. To provide tubular orifices they are formed in externally projecting ribs 52 which may be made hollow by internal grooves 53. Preferably the bottom wall 54 slopes steeply to be somewhat streamlined. This may be more desirable for future double spargers than the mere drainage slope shown in FIGURE 2. A saddle disk 56 is sealed in each sparger by a thin gasket 57, this disk being sealed to the header by a gasket 26'. Proper alignment of the saddle of disk 56 is ensured by its being notched to receive teeth 58 found on body 51.

As thus described the spargers, except for the slope 54, have been on sale, possibly for over a year. The manner of being secured illustrated in FIGURES 4 and 5 is relatively new, however, though invented by others. It may be briefly mentioned that annular boss or sleeve 61 formed on disk 56 ensures proper positioning. Stainless steel straps 62, drawn tight by stainless steel coil springs 63, holds everything tight without the danger of error inherent in using nuts as in FIGURES 1 and 2. This spring and boss method is now preferred for double spargers too, one spring and band assembly being used in place of each of the two U-bolts 27.

The six inch difference in elevation between the primary orifices 31 and the supplemental orifices has been found to be so satisfactory that it is now regarded as a standard dimension. A longer dimension would be wasteful of power. A shorter dimension would be less proved as to having high efficiency under all conditions, but it might nevertheless be worth trying if long periods of operation were expected with such low air flow rates that the pipes 42 would not be occasionally cleaned by escape of air. Relatively minor experience indicates that the four to six inch range will almost certainly be fully efficient.

According to practice now preferred, such a number of spargers to be installed in a tank is chosen as will yield, with the expected normal air requirements for the tank that approximately one-third of the air issuing from each sparger will issue through the supplemental orifice. This has been found highly satisfactory, partly because moderate adjustment below the planned normal will still keep the tubes 42 clean. If extended initial operation at much lower than normal rates is expected, some spargers to be used ultimately are preferably omitted, the holes for them in the headers being blocked off, or single spargers may be used where double spargers are planned.

For special purposes, as where especially uniform distribution of air throughout an air-lift area is more important than the maximum break up of bubbles in the airlift column, additional primary orifices 31 may be provided intermediate the two end clusters illustrated. There can, in fact, be a continuous row of such orifices at about three-inch intervals. Advantages of those aspects of the invention other than the maximum break up of bubbles by air-lift columns will still be present. Ideally, there would be an even distribution of the auxiliary orifice pipes 42, also, such as one tube for each four orifices, with walls sloping down to each.

Various forms of the invention, and especially that of the last paragraph, have an ability to release tremendous quantities of air in a practical manner without great back pressure. Under some conditions this has been found to achieve an unexpected result of causing a much higher percentage of the oxygen to be absorbed. Some test results tend to indicate an increased percentage of absorption with single spargers. With eductor tube action in the middle of a large and unusually deep (24 feet) tank and good distribution of spargers throughout the cross section of the eductor tube at 12 feet submergence, air release at the rate of about 90 c.f.m. per 1000 c.f. of total volume of tank contents, and a baffle over the eductor tube, an amazing 10% absorption of oxygen has been indicated (though more tests are yet to be made). This compares with .4 to 7½% in typical prior installations of various types of diffusers. The efficiency indicates that the bubbles are broken up in a new way, but that is not the present invention.

We claim:

1. The method of treating watery waste including the steps of
   flowing the waste through a tank, while maintaining a deep body of the waste in the tank, at a flow rate to provide a substantial detention period;
   liberating air through separated clusters of gross orifices deep in the tank along one side of an area for establishing a rolling movement of the waste; said orifices being at a first level approximately as low as air supply conduit means leading to them, and being sufficient in number, and so distributed, to set up a turbulent concentrated air-lift column,
   liberating additional air at substantial volume for prolonged periods through auxiliary large openings at a second level, each so positioned below one of said clusters that air will rise therefrom into the column above the cluster and comprising a substantially horizontal bottom opening of a conduit extending down from substantially the lowest point of the air supply conduit means, and with sufficient continuity of liberation of air through the large openings throughout the period of operation to keep said conduit free from clogging.

2. The method of treating watery waste including the steps of
   flowing the waste through a tank, while maintaining a deep body of waste in the tank, at a flow rate to provide a substantial detention period;
   liberating air through separated clusters of gross orifices deep in the tank along one side of an area for establishing a rolling movement of the waste; said orifices being at a first level approximately as low as air supply conduit means leading to them, and being sufficient in number and so distributed, to set up a turbulent concentrated air-lift column,
   liberating additional air at substantial volume for prolonged periods through auxiliary large openings at a second level, each so positioned below one of said clusters that air will rise therefrom into the column above the cluster and comprising a substantially horizontal bottom opening of a conduit extending down from substantially the lowest point of the air supply conduit means, and wtih sufficient continuity of liberation of air through the large openings throughout the period of operation to keep said conduit free from clogging, and
   varying the rate of total air liberation, to meet varying needs for the air in treatment, mainly by varying the rate of flow through the auxiliary large openings, within a range of rates in which the air rises to merge with the concentrated column and be broken by it into small bubbles contributing to the general force and turbulence of the air-lift column.

3. The method of treating watery waste including the steps of
   flowing the waste through a tank, while maintaining a deep body of the waste in the tank, at a flow rate to provide a substantial detention period;
   liberating air through separated clusters of gross orifices deep in the tank along one side of an area for establishing a rolling movement of the waste; said orifices being at a first level approximately as low as air supply conduit means leading to them, having a transverse dimension approximately in the range of one-eighth to seven-thirty-seconds inch, and being sufficient in number, and so distributed, to set up a turbulent concentrated air-lift column; and said liberation through the orifices being at a flow rate close to the minimum safely preventing waste from creeping in into said orifices, liberating additional air at substantial volume for prolonged periods through auxiliary large openings at a second level, each so positioned below one of said clusters that air will rise therefrom into the column above said cluster and comprising a substantially horizontal bottom opening of a conduit extending down from substantially the lowest point of the air supply conduit means and with sufficient continuity of liberation of air through the large openings throughout the period of operation to keep said conduit free from clogging, and varying the rate of total air liberation, to meet varying needs for the air in treatment, mainly by varying the rate of flow through the auxiliary large openings, within a range of rates in which the air rises to merge with the concentrated column and be broken by it into small bubbles contributing to the general force and turbulence of the air-lift column.

4. The method of treating waste liquid by liberating air from gross orifices grouped in clusters to form a plurality of spargers deeply submerged in the liquid and which have auxiliary discharge tubes opening below the respective clustered orifices, characterized by supplying air to the spargers at a rate to develop sufficient back pressure through the orifices to cause air to flow out also through the auxiliary discharge tubes at a substantial rate.

5. An elongate header having mounted along a side thereof and communicating therewith a series of double spargers each having two spargers widely separated from each other in a direction transverse of the header to provide two lines of spargers, each double sparger having a hollow body which at a mid-point thereof has a fitting securing it to the side of a header with a passage therethrough communicating with a hole through the header, and maintaining a transverse disposition of the body with respect to the header;

the two spargers being formed at the ends of the hollow body, each such sparger including four tubular orifices extending substantially along two parallel lines, one pair of which opens in the opposite direction from the other pair at spacings of the order of one and three-quarter inches along said lines, said lines being spaced apart in the order of three and one-quarter inches.

6. The header and double spargers of claim 5 in which the spargers of each double sparger are separated center to center a distance of the order of twelve inches.

7. The header and double spargers of claim 5 in which the double spargers are mounted on the bottom of the header and the bottom surfaces of the hollow body slope downwardly toward the spargers to aid the flushing of sludge toward the spargers when air is supplied after a shutdown.

8. An elongate header having mounted along a side thereof and communicating therewith a series of double spargers each having two gross-orifice spargers widely separated from each other in a direction transverse of the header to provide two lines of spargers, each double sparger comprising a hollow body which at a mid-point thereof has a fitting securing it to the side of a header with a passage therethrough communicating with a hole through the header, and maintaining a transverse disposition of the body with respect to the header;

the separated spargers being formed at the ends of the hollow body;

characterized in that the double spargers are mounted on the bottom of the header and the bottom surfaces of the hollow body slope downwardly toward the separated spargers to aid the flushing of sludge toward these spargers when air is supplied after a shutdown; said separated spargers being provided with flush-out conduits extending downwardly therefrom.

9. An elongate header having mounted along a side thereof and communicating therewith a series of double spargers each having two gross-orifice spargers widely separated from each other in a direction transverse of the header to provide two lines of spargers, each double sparger comprising a hollow body which at a mid-point thereof has a fitting securing it to the side of a header with a passage therethrough communicating with a hole through the header, and maintaining a transverse disposition of the body with respect to the header;

the separated spargers being formed at the ends of the hollow body;

characterized in that the double spargers are mounted on the bottom of the header and the bottom surfaces of the hollow body slope downwardly toward the separated spargers to aid the flushing of sludge toward these spargers when air is supplied after a shutdown; said separated spargers being provided with means for attaching thereto flush-out conduits extending downwardly therefrom.

10. The method of achieving a well-dispersed fine-bubble gas-lift column with coarse-bubble liberation from a small number of orifices at low pressure including flowing gas from a supply pipe downwardly into the upper end of a submerged sparger liberating the gas through gross primary orifices in the sparger at one level clustered in a group and disposed for distributing gas to a cluster of rise points sufficiently separated for the gas bubble streams to rise separately and sufficiently close together to cooperate in forming one concentrated gas-lift column, and, while maintaining liberation of gas through said orifices in full volume to maintain a vigorous gas-lift column thereabove, liberating additional gas, from the same stream in substantial volume for prolonged periods through a larger orifice in a substantially horizontal plane at a lower level in a position to rise and merge in said pattern, the separation of the levels being appropriate for maintaining, while gas is liberated at the lower level, a pressure on gas at the higher orifices sufficient to maintain uniformity of flow in the pattern and to exclude creeping-in of liquid into the higher orifices, but not greatly in excess thereof.

11. A diffuser for producing a well-dispersed fine-bubble gas-lift column in a body of liquid comprising a sparger having a supply opening at its top, a small number of gross primary orifices at a first level communicating with the supply opening, and a larger secondary orifice at a lower level also communicating with the supply opening and lying in a horizontal plane, the distance between said levels being appropriate for maintaining a pressure on gas at the higher orifices sufficient to maintain uniformity of flow in the pattern and to exclude creeping-in of liquid into the higher orifices, but not greatly in excess thereof whereby higher pressures provide substantial flow through the lower orifice, and the primary orifices being disposed for distributing gas to a cluster of rise points sufficiently separated for the gas bubble streams to rise separately and sufficiently close together to cooperate in forming one concentrated gas-lift column.

12. A diffuser system for producing a plurality of concentrated air-lift columns in a body of liquid, each column having fine bubbles well dispersed therein, comprising a horizontal elongate header, a plurality of spargers thereon distributed lengthwise thereof, each having a supply opening at its top communicating with the header, and each having a small number of gross primary orifices at a first level communicating with the supply opening, and a larger secondary orifice at a lower level also communicating with the supply opening and lying in a horizontal plane, the distance between said levels being appropriate for maintaining a pressure on air at the higher orifices sufficient to maintain uniformity of flow in the pattern and to exclude creeping-in of liquid into the higher orifices, but not greatly in excess thereof, and the primary orifices of each sparger being disposed for distributing air to a cluster of rise points sufficiently separated from each other for the gas bubble streams to rise separately and sufficiently close together to cooperate in forming one concentrated air-lift column; said spargers having their walls extending downwardly from said supply openings to said secondary orifice.

13. A diffuser system for producing a columnar curtain by well-dispersed fine-bubble air-lift effect in a body of liquid comprising air discharge means including a horizontal elongate header and forming gross primary orifices arranged in clusters along the header at a first level for discharging air from the header and larger secondary orifices at a lower level for discharging air at substantial volume from the header and through which liquid from the header at the bottom may drain, the secondary orifices lying substantially in a horizontal plane, the distance between said levels being appropriate for maintaining a pressure on air at the higher orifices sufficient to maintain uniformity of flow in the pattern and to exclude creeping-in of liquid into the higher orifices, but not greatly in excess thereof, and the primary orifices being disposed for distributing gas to a cluster of rise points sufficiently separated for the gas bubble streams to rise separately and sufficiently close together to cooperate in forming a concentrated gas-lift column; and each secondary orifice being positioned below a cluster of primary orifices where air from the secondary orifices will rise into and merge with the air from the column developed by air from the primary orifices rising from the cluster of rise points.

14. A multiple sparger having a hollow elongate body having on a first side a saddle fitting with its axis transverse the length of the elongate body to secure the body to the side of a header while extending transversely of the length of the header, the fitting having a large passage for supply of air to the hollow body from a hole in the header; the hollow body having on the opposite side a plurality of tubes extending downwardly when the body is positioned with the first side as the top side, substantially all parts of said opposite side then sloping downwardly toward one of said tubes; said tubes opening into the hollow body and opening at their free ends for discharge from the hollow body, and orifices substantially smaller than the diameter of the tubes, more specifically of one-eighth inch to one-quarter inch diameter, opening from the hollow body through the other two sides of the hollow body at a plane which is horizontal when the body is so positioned, there being over each tube several such orifices grouped to cooperate in forming an air-lift column, when air issues from them while submerged, into which air from the tube will rise.

15. A multiple sparger according to claim 14 in which the open free end of the tube is spaced approximately six inches from said plane so that while submerged air can be discharged from the tube copiously while pressure within the hollow body remains only moderately above that needed to prevent water from creeping-in at the orifices and to establish a good vigorous air-lift column above the orifices.

16. A diffuser for producing a well-dispersed fine-bubble gas-lift column in a body of liquid comprising a sparger having a supply opening at its top, a small number of gross primary orifices at a first level communicating with the supply opening, and a larger secondary orifice at a lower level also communicating with the supply opening and lying in a horizontal plane, the distance between said levels being a distance, approximately 6 inches, appropriate for maintaining a pressure on gas at the higher orifices sufficient to maintain uniformity of flow in the pattern and to exclude creeping-in of liquid into the higher orifices, but not greatly in excess thereof whereby higher pressures provide substantial flow through the lower orifice, and the primary orifices being disposed for distributing gas to a cluster of rise points sufficiently separated for the gas bubble streams to rise separately and sufficiently close together to cooperate in forming one concentrated gas-lift column.

17. A diffuser system for producing a columnar curtain by well-dispersed fine-bubble air-lift effect in a body of liquid comprising air discharge means including a horizontal elongate header and forming gross primary orifices arranged in clusters along the header at a first level for discharging air from the header and larger secondary orifices at a lower level for discharging air at substantial volume from the header and through which liquid from the header at the bottom may drain, the secondary orifices lying substantially in a horizontal plane, the distance between said levels being a distance, approximately 6 inches, appropriate for maintaining a pressure on air at the higher orifices, but not greatly in excess thereof, and the primary orifices being disposed for distributing gas to a cluster of rise points sufficiently separated for the gas bubble streams to rise separately and sufficiently close together to cooperate in forming a concentrated gas-lift column; and each secondary orifice being positioned below a cluster of primary orifices where air from the secondary orifices will rise into and merge with the air from the column developed by air from the primary orifices rising from the cluster of rise points.

References Cited

UNITED STATES PATENTS

| | | | |
|---|---|---|---|
| 1,098,190 | 5/1914 | Stone | 261—124 |
| 2,050,117 | 8/1936 | Page | 261—124 |
| 2,911,205 | 11/1959 | Kraus | 261—122 |
| 3,153,682 | 10/1964 | Walker | 261—124 |
| 3,242,072 | 3/1966 | Walker | 210—15 |

FOREIGN PATENTS

| | | |
|---|---|---|
| 195,355 | 5/1957 | Austria. |
| 239,271 | 9/1925 | Great Britain. |
| 571,970 | 1/1958 | Italy. |

TIM R. MILES, Primary Examiner

U.S. Cl. X.R.

210—220